United States Patent
Onodera et al.

(10) Patent No.: US 10,189,103 B2
(45) Date of Patent: Jan. 29, 2019

(54) WIRE ELECTRICAL DISCHARGE MACHINING APPARATUS

(71) Applicant: Mitsubishi Electric Corporation, Tokyo (JP)

(72) Inventors: Yasuo Onodera, Tokyo (JP); Yuhei Domori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 325 days.

(21) Appl. No.: 15/025,915

(22) PCT Filed: Oct. 31, 2013

(86) PCT No.: PCT/JP2013/079591
§ 371 (c)(1),
(2) Date: Mar. 30, 2016

(87) PCT Pub. No.: WO2015/063932
PCT Pub. Date: May 7, 2015

(65) Prior Publication Data
US 2016/0236292 A1 Aug. 18, 2016

(51) Int. Cl.
*B23H 7/20* (2006.01)
*B23H 1/02* (2006.01)
(Continued)

(52) U.S. Cl.
CPC ............... *B23H 1/022* (2013.01); *B23H 1/04* (2013.01); *B23H 7/065* (2013.01)

(58) Field of Classification Search
CPC ........... B23H 1/022; B23H 1/04; B23H 7/065
(Continued)

(56) References Cited

U.S. PATENT DOCUMENTS 4,363,948 A * 12/1982 Itoh .................... B23H 7/04
219/69.12
4,703,143 A * 10/1987 Okubo ................ B23H 7/065
219/69.1

(Continued)

FOREIGN PATENT DOCUMENTS

JP 60-108222 A 6/1985
JP 1-501051 A 4/1989
(Continued)

OTHER PUBLICATIONS

International Search Report of PCT/JP2013/079591 dated Feb. 4, 2014 [PCT/ISA/210].

*Primary Examiner* — Thien S Tran
(74) *Attorney, Agent, or Firm* — Sughrue Mion, PLLC; Richard C. Turner

(57) ABSTRACT

A wire electrical discharge machining apparatus capable of improving the shape precision of a continuous corner part includes a corner speed coefficient calculation device calculating a machining speed ratio between a middle corner section and a straight part from a machining volume ratio between the straight part and the middle corner section in which machining volume becomes a constant value. A corner speed coefficient interpolation device interpolates a speed coefficient calculated by the corner speed coefficient calculation device in a pre-corner section and a post-corner section. A speed reference calculation device calculates a machining speed reference based on a representative speed and the corner speed coefficient, and a drive control device controls a drive device. A continuous corner detection device determines whether continuous corner sections overlap each other when the length of the straight part connecting two corner parts is shorter than the length of the pre-corner section.

5 Claims, 14 Drawing Sheets

(51) Int. Cl.
*B23H 7/06* (2006.01)
*B23H 1/04* (2006.01)

(58) Field of Classification Search
USPC ....... 219/69.12, 69.13, 69.16, 69.17; 700/98, 700/162, 187, 188
See application file for complete search history.

(56) References Cited

U.S. PATENT DOCUMENTS

| | | | | |
|---|---|---|---|---|
| 4,713,517 A | * | 12/1987 | Kinoshita | ............... B23H 7/065 |
| | | | | 219/69.12 |
| 4,736,086 A | * | 4/1988 | Obara | ...................... B23H 7/06 |
| | | | | 219/69.12 |
| 4,837,415 A | * | 6/1989 | Magara | .................. B23H 7/065 |
| | | | | 219/69.12 |
| 5,021,622 A | | 6/1991 | Magara et al. | |
| 6,774,334 B1 | | 8/2004 | Kobayashi | |
| 8,642,915 B2 | | 2/2014 | Onodera et al. | |
| 8,829,383 B2 | | 9/2014 | Onodera et al. | |
| 2011/0100959 A1 | * | 5/2011 | Onodera | ................ B23H 7/065 |
| | | | | 219/69.13 |
| 2011/0226742 A1 | * | 9/2011 | Onodera | ................ B23H 7/065 |
| | | | | 219/69.13 |

FOREIGN PATENT DOCUMENTS

| | | |
|---|---|---|
| JP | 01-127226 A | 5/1989 |
| JP | 2007-075996 A | 3/2007 |
| JP | 5077433 B2 | 11/2012 |
| WO | 02/36295 A1 | 5/2002 |
| WO | 2010/050014 A1 | 5/2010 |

\* cited by examiner

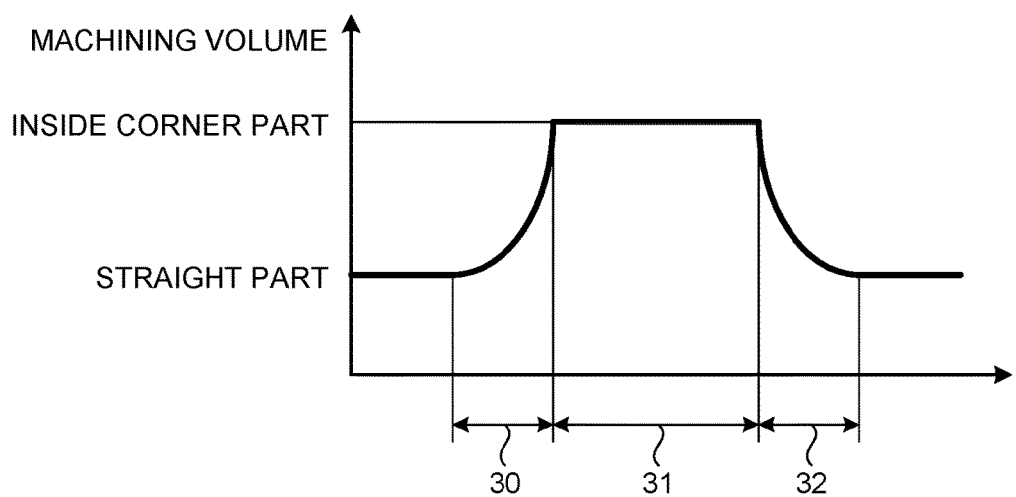
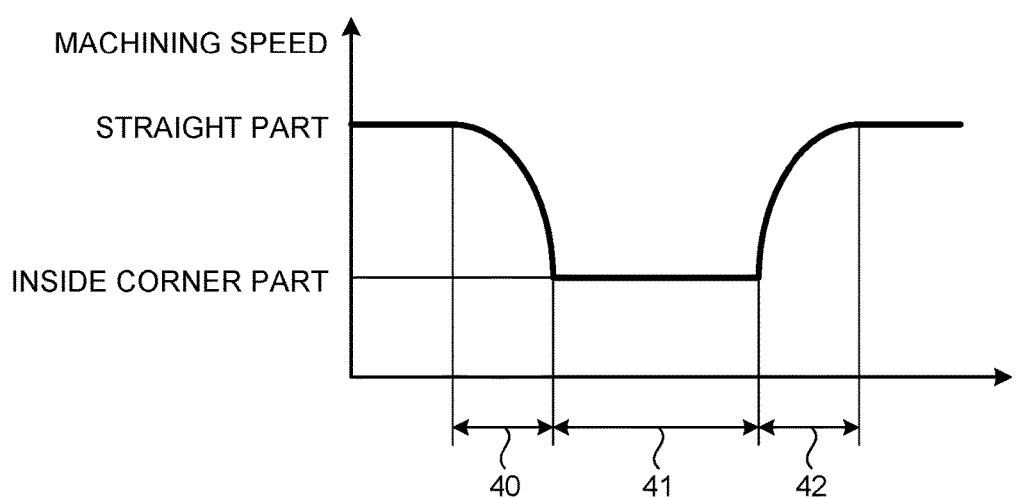

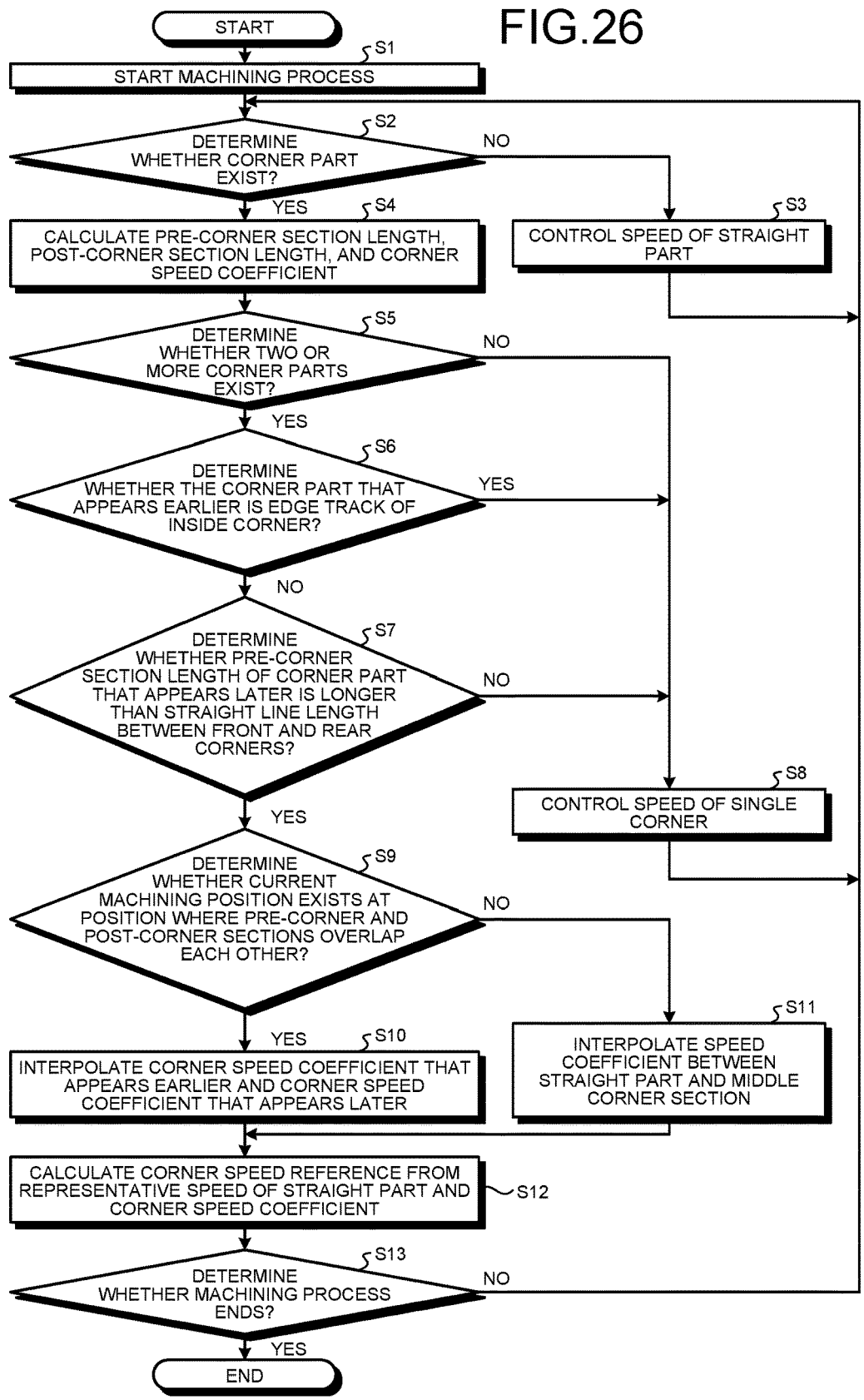

WIRE ELECTRICAL DISCHARGE MACHINING APPARATUS

CROSS REFERENCE TO RELATED APPLICATIONS

This application is a National Stage of International Application No. PCT/JP2013/079591, filed Oct. 31, 2013, the contents of which are incorporated herein by reference in its entirety.

FIELD

The present invention relates to a wire electrical discharge machining apparatus.

BACKGROUND

When a corner shape of a workpiece is machined by a wire electrical discharge machining process, grooving called rough processing is performed firstly while a finishing allowance is left in advance. Then, from the finish machining performed secondly, an electrical condition is switched to one having a low machining energy while an offset amount for the left finishing allowance is gradually decreased. In this way, the corner shape precision is improved.

Here, when the machining process is performed at a constant machining speed, a machining allowance in a corner part is increased or decreased compared with a machining allowance in a straight part. Therefore, when the machining allowance in the corner part is increased a machining remainder occurs compared to a target shape; and when the machining allowance in the corner part is decreased an excessive machining occurs compared to a target shape. As a result, a problem arises in that the corner shape precision is degraded. Here, in order to improve the shape precision of the corner part, there is a need to uniformly control the machining volume for the straight part and the corner part per unit time.

In contrast, in the technique disclosed in Patent Literature 1, the machining volume per unit movement distance of a wire electrode for the straight part and the corner part are accurately calculated based on information stored in a corner control information storage unit. Then, a machining speed ratio between the straight part and the corner part is calculated in advance in response to a machining volume ratio between the straight part and the corner part, the machining speed at the corner part is controlled at the machining speed calculated from the machining speed ratio and the machining speed of the straight part in order to improve the corner shape precision.

CITATION LIST

Patent Literature

Patent Literature 1: Japanese Patent No. 5077433

SUMMARY

Technical Problem

The corner part includes pre-corner and post-corner sections in which a machining volume changes transitionally. Since each length of the pre-corner and post-corner sections is very short, a shape is rarely formed in which the pre-corner and post-corner sections overlap each other between the continuous corners. However, in recent years, the machining shape has become complex, and hence a shape in which the pre-corner and post-corner sections overlap each other between the corners (hereinafter, referred to as "continuous corners") is machined in many cases. By the technique disclosed in Patent Literature 1, there is an effect of improving the shape precision of the single corner shape. However, in the continuous corner shape, an appropriate corner speed reference cannot be calculated in the section having the overlapping continuous corners. For this reason, a problem arises in that the corner shape precision is degraded.

The present invention is made in view of the above description, and an object of the present invention is to obtain a wire electrical discharge machining apparatus capable of improving shape precision of a continuous corner part.

Solution to Problem

To solve the above described problem and achieve the object, a wire electrical discharge machining apparatus according to the present invention applies a pulse voltage between a wire electrode and a workpiece while relatively moving the wire electrode and the workpiece by a drive device based on an NC program.

The wire electrical discharge machining apparatus includes: a representative speed calculation device that calculates a representative speed of a straight part when the straight part is being machined; a pre-corner section length calculation device that calculates the length of a pre-corner section in which a machining volume changes transitionally before an entrance of a corner part when the corner part is detected by the NC program; a post-corner section length calculation device that calculates the length of a post-corner section in which a machining volume changes transitionally before an exit of the corner part; a corner speed coefficient calculation device that calculates a machining speed ratio between a middle corner section and the straight part from a machining volume ratio between the straight part and the middle corner section in which the machining volume of the corner part becomes a constant value; a corner speed coefficient interpolation device that interpolates a corner speed coefficient calculated by the corner speed coefficient calculation device in the pre-corner section and the post-corner section; a speed reference calculation device that calculates a machining speed reference of the corner part based on the representative speed and the corner speed coefficient interpolated by the corner speed coefficient interpolation device; a drive control device that controls the drive device by the machining speed reference calculated by the speed reference calculation device; and a continuous corner detection device that determines whether continuous corner sections overlap each other when the length of the straight part connecting two corner parts is shorter than the length of the pre-corner section calculated by the pre-corner section length calculation device.

Advantageous Effects of Invention

According to the wire electrical discharge machining apparatus of the present invention, since an appropriate machining speed reference can be calculated even when the corner sections of the continuous corners overlap each other, there is an effect that shape precision of a continuous corner part can be improved.

BRIEF DESCRIPTION OF DRAWINGS

FIG. 3 is a diagram illustrating a variation in machining volume for every predetermined feeding distance in a circular-arc track of an inside corner of the present embodiment.

FIG. 4 is a diagram illustrating an ideal machining speed reference for obtaining the same shape and size of a corner part as that of a straight part in a circular-arc track of an inside corner of the present embodiment.

FIG. 26 is a flowchart illustrating a corner control operation when a corner is machined by the wire electrical discharge machining apparatus according to the embodiment of the present invention.

DESCRIPTION OF EMBODIMENTS

Hereinafter, an embodiment of a wire electrical discharge machining apparatus according to the present invention will be described in detail with reference to the drawings. Further, the present invention is not limited to the present embodiment.

Embodiment

Figure 1:
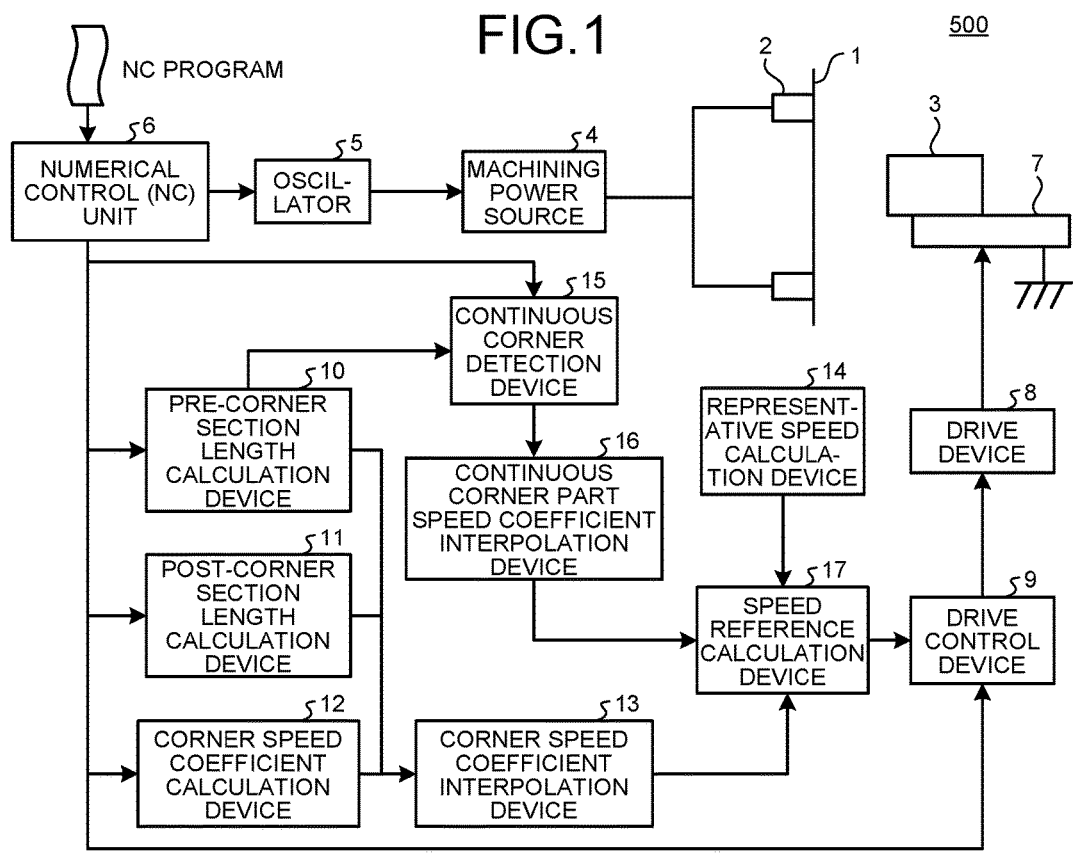
FIG. 1 is a block diagram illustrating the entire configuration of a wire electrical discharge machining apparatus according to an embodiment of the present invention.

FIG. 1 is a block diagram illustrating an entire configuration of a wire electrical discharge machining apparatus 500 described in the embodiment of the present invention. The wire electrical discharge machining apparatus 500 includes a wire electrode 1, a pair of power feeders 2 contacting the wire electrode 1, a machining power source 4 applying a high voltage to the power feeders 2 in response to the output of an oscillator 5, a drive device 8 moving a workpiece table 7 equipped with a workpiece 3, a drive control device 9 controlling the drive device 8, and a numerical control (NC) unit 6 controlling the oscillator 5 and the drive control device 9 at the upper level. Then, a machining process is performed by an electrical discharge generated between the wire electrode 1 and the workpiece 3 while the wire electrode 1 and the workpiece 3 are moved relatively at a predetermined speed. That is, the wire electrical discharge machining apparatus 500 performs a machining process by applying a pulse voltage between the wire electrode 1 and the workpiece 3 while relatively moving the wire electrode 1 and the workpiece 3 as the workpiece table 7 is moved by the drive device 8 along a track programmed in advance by a NC program executed by the numerical control (NC) unit 6.

Furthermore, the wire electrical discharge machining apparatus 500 of the present embodiment includes a pre-corner section length calculation device 10 that calculates the length of a pre-corner section in which a machining volume changes transitionally before an entrance of a corner part, a post-corner section length calculation device 11 that calculates the length of a post-corner section in which a machining volume changes transitionally before an exit of the corner part, a corner speed coefficient calculation device 12 that calculates the machining speed ratio between a straight part and the corner part, a corner speed coefficient interpolation device 13 that interpolates the corner speed coefficients in the pre-corner and post-corner sections, a representative speed calculation device 14 that calculates the representative machining speed of the straight part, a continuous corner detection device 15 that determines whether a current corner is a continuous corner depending on the overlapping of the corner section of the continuous corner, a continuous corner part speed coefficient interpolation device 16 that interpolates the speed coefficient in the overlapping part of the corner section of the continuous corner, and a speed reference calculation device 17 that calculates a machining speed reference.

Figure 2:
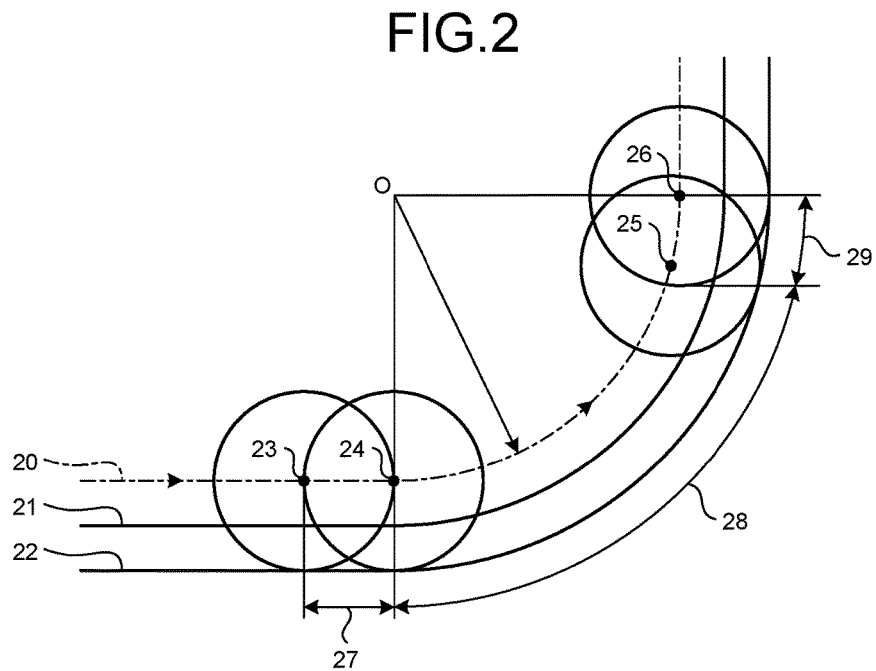
FIG. 2 is a diagram illustrating a state where finish machining is being performed on an inside corner along a circular-arc track plural times according to the present embodiment.

Before the description of the operation of the wire electrical discharge machining apparatus 500 according to the embodiment of the present invention, the principle of the wire electrical discharge machining process according to the present embodiment will be described. First, a machining volume change obtained when a single corner is machined will be described. FIG. 2 is a diagram illustrating a state where finish machining is being performed on an inside corner of a workpiece 3 plural times along a circular-arc track in the present embodiment. The drawing paper depth direction indicates the plate thickness direction of the workpiece 3. A one-dotted chain line 20 indicates the relative movement track (offset track) of the center of the wire electrode 1 with respect to the workpiece 3 in the current machining process, and an arrow indicates the relative movement direction. A solid line 21 indicates the machining surface of the workpiece 3 obtained by the previous machining process, and a solid line 22 indicates the machining surface of the workpiece 3 in the current machining process. Circles respectively centered at points 23, 24, 25, and 26 will be referred to as circles (hereinafter, referred to as electrical discharge circles) obtained by adding an electrical discharge gap length to the wire electrode 1. A point O indicates the center point of the corner.

The point 24 indicates a point at which the center of the wire electrode 1 enters the corner part from the straight part, and the point 26 indicates a point at which the center of the wire electrode 1 enters the straight part from the corner part. In the straight part in which the center of the wire electrode 1 machining the straight part reaches the point 23, the machining volume is constant every time the wire electrode 1 moves by a predetermined distance. After the center of the wire electrode 1 reaches the point 23, the machining volume increases transitionally every time the wire electrode moves by a predetermined distance until the center of the wire electrode reaches the point 24. A section in which the machining volume changes every time the wire electrode 1 moves by a predetermined distance before the entrance of the corner part will be referred to as a pre-corner section. Specifically, this section is indicated by a line 27.

After the center of the wire electrode 1 reaches the point 24, the machining volume obtained every time the wire electrode 1 moves by a predetermined distance is constant until the center of the wire electrode reaches the point 25 while not being changed from the machining volume at the point 24. A section in which the machining volume obtained every time the wire electrode 1 moves by a predetermined distance is constant in the corner part will be referred to as a middle corner section. Specifically, this section is indicated by a line 28.

After the center of the wire electrode 1 reaches the point 25, the machining volume obtained every time the wire electrode 1 moves by a predetermined distance decreases transitionally until the center of the wire electrode reaches the point 26. A section in which the machining volume changes every time the wire electrode 1 moves by a predetermined distance before the exit of the corner part will be referred to as a post-corner section. Specifically, this section is indicated by a line 29.

After the center of the wire electrode 1 reaches the point 26, the machining volume obtained every time the wire electrode 1 moves by a predetermined distance is constant while not being changed from the machining volume at the point 26. Here, the machining volume at the point 26 is equal to the machining volume at the point 23.

In this way, the pre-corner section in which the machining volume changes transitionally before the entrance of the corner part and the post-corner section in which the machining volume changes transitionally before the exit of the corner part exist in the corner part. Here, a case has been described in which the inside corner is machined along the circular-arc track, but sections in which the machining volume change transitionally also exist even when the outside corner is machined along the circular-arc track and when the outside corner is machined along the edge track and when the inside corner is machined along the edge track. However, the end point of the pre-corner section becomes the vertex of the edge track in the edge track of the inside corner, and hence the end point of the pre-corner section matches the exit of the corner part. Thus, the post-corner section does not exist.

A machining volume obtained every time the wire electrode 1 moves by a predetermined distance in the corner part and a machining speed reference realizing satisfactory corner shape precision with respect to a change in the machining volume will be described.

FIG. 3 illustrates a change in the machining volume obtained every time the wire electrode 1 moves by a predetermined distance in the circular-arc track of the inside corner of the present embodiment. The section 30, the section 31, and the section 32 respectively indicate the pre-corner section, the middle corner section, and the post-corner section of FIG. 2.

FIG. 4 illustrates an ideal machining speed reference for obtaining the same shape and size of the straight part as that of the corner part in the circular-arc track of the inside corner of the present embodiment. Sections 40, 41, and 42 are respectively the pre-corner section, the middle corner section, and the post-corner section in FIG. 2. Since the machining speed reference is in inverse proportion to the machining volume obtained every predetermined movement distance, the machining speed ratio of the corner part with respect to the straight part is opposite to the machining volume ratio illustrated in FIG. 3.

Here, the machining volumes of the straight part and the corner part are calculated in advance, and the corner speed reference with respect to the straight part machining speed is generated so that the machining volume ratio between the straight part and the corner part obtained every predetermined movement distance is inverted, thereby realizing satisfactory corner machining shape precision.

Specifically, the inverse ratio of the machining volume is set to the corner speed coefficient, and the corner speed coefficient is multiplied by the representative speed of the straight part. As the equation of the machining volume in the middle corner section, an existing method disclosed in Patent Literature 1 can be used. Further, the corner speed coefficients of the pre-corner and post-corner sections are interpolated to the corner speed coefficient of the middle corner section by an appropriate function.

Figure 5:
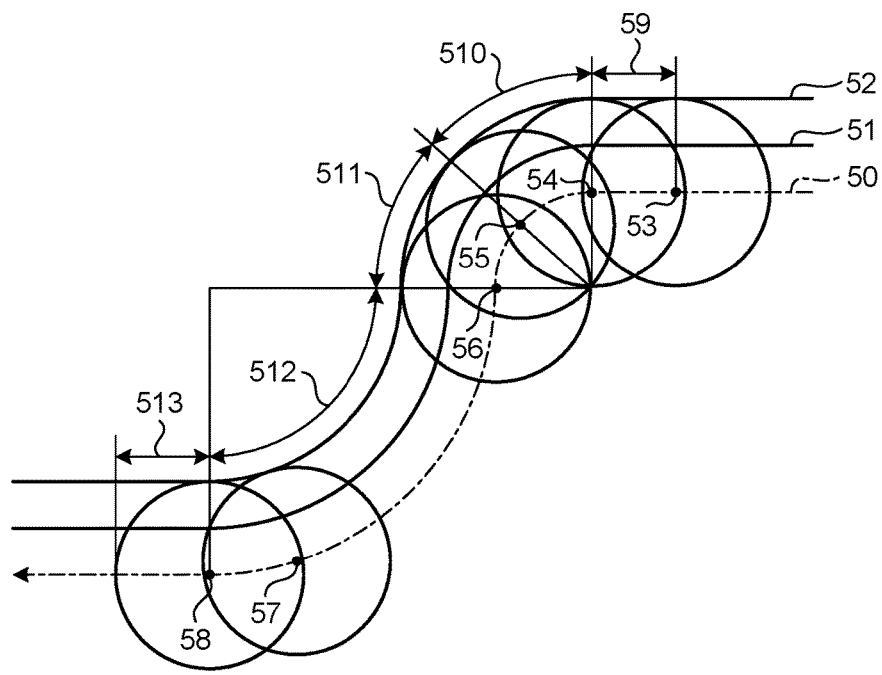
FIG. 5 is a diagram illustrating a state where a continuous shape from a circular-arc track of an inside corner to a circular-arc track of an outside corner in the present embodiment is being machined.

Next, a case will be described in which the corner shape is continuous. FIG. 5 illustrates a state where a continuous shape from the circular-arc track of the inside corner to the circular-arc track of the outside corner of the present embodiment is being machined. The drawing paper depth direction indicates the plate thickness direction of the workpiece 3. A one-dotted chain line 50 indicates the relative movement track (offset track) of the center of the wire electrode 1 with respect to the workpiece 3 in the current machining process, and an arrow indicates the relative movement direction. A solid line 51 indicates the machining surface of the workpiece 3 obtained by the previous machining process, and a solid line 52 indicates the machining surface of the workpiece 3 in the current machining process. Circles centered at points 53, 54, 55, 56, 57, and 58 are electrical discharge circles.

The point 53 indicates the start point of the pre-corner section of the inside corner; the point 54 indicates the end point of the pre-corner section of the inside corner and the start point of the middle corner section of the inside corner; the point 55 indicates the end point of the middle corner section of the inside corner, the start point of the post-corner section of the inside corner, and the start point of the pre-corner section of the outside corner; the point 56 indicates the end point of the post-corner section of the inside corner, the end point of the pre-corner section of the outside corner, and the start point of the middle corner section of the outside corner; the point 57 indicates the end point of the middle corner section of the outside corner and the start point of the post-corner section of the outside corner; and the point 58 indicates the end point of the post-corner section of the outside corner.

Further, a line 59 indicates the pre-corner section of the inside corner; a line 510 indicates the middle corner section of the inside corner; a line 511 indicates the post-corner section of the inside corner and the pre-corner section of the outside corner; a line 512 indicates the middle corner section of the outside corner; and a line 513 indicates the post-corner section of the outside corner.

In the section of the line 511, the post-section of the inside corner overlaps the pre-section of the outside corner. The overlapping of the corner section occurs when the pre-corner section length of the post-corner is longer than the length of the line connecting two continuous corners in the continuous corners. In this way, when the corner sections of two continuous corners overlap each other, the corner speed coefficient cannot be interpolated as in the pre-corner and post-corner sections of the single corner.

Figure 6:
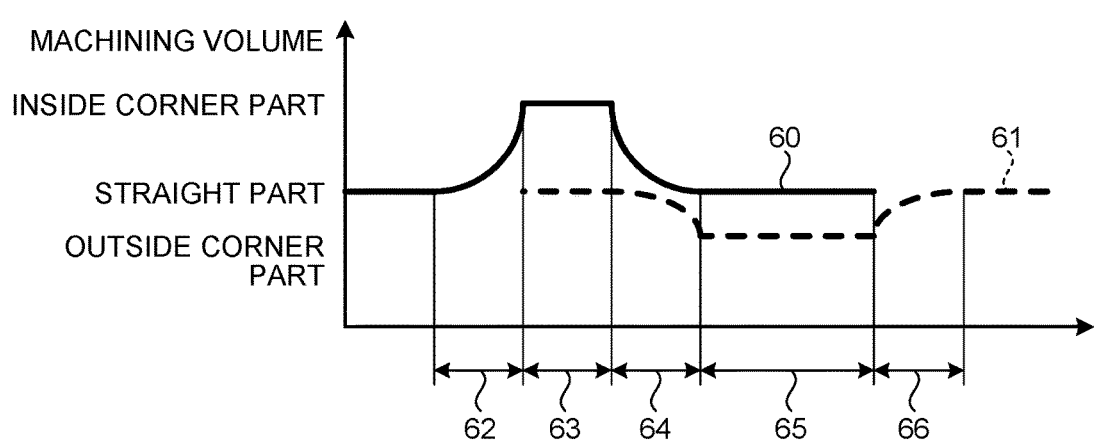
FIG. 6 is a diagram depicting a machining volume of a circular-arc track of a single inside corner and a machining volume of a circular-arc track of a single outside corner of the present embodiment so that a post-section of the inside corner overlaps a pre-section of the outside corner.

FIG. 6 is a diagram depicting the machining volume of the circular-arc track of the single inside corner and the machining volume of the circular-arc track of the single outside corner of the present embodiment so that the post-section of the inside corner and the pre-section of the outside corner overlap each other. A solid line 60 indicates the machining volume of the circular-arc track of the single inside corner, and a dashed line 61 indicates the machining volume of the circular-arc track of the single outside corner. Further, sections 62 and 63 respectively indicate the pre-corner section and the middle corner section of the inside corner, a section 64 indicates the post-corner section of the inside corner and the pre-corner section of the outside corner, and sections 65 and 66 respectively indicate the middle corner section and the post-corner section of the outside corner.

Figure 7:
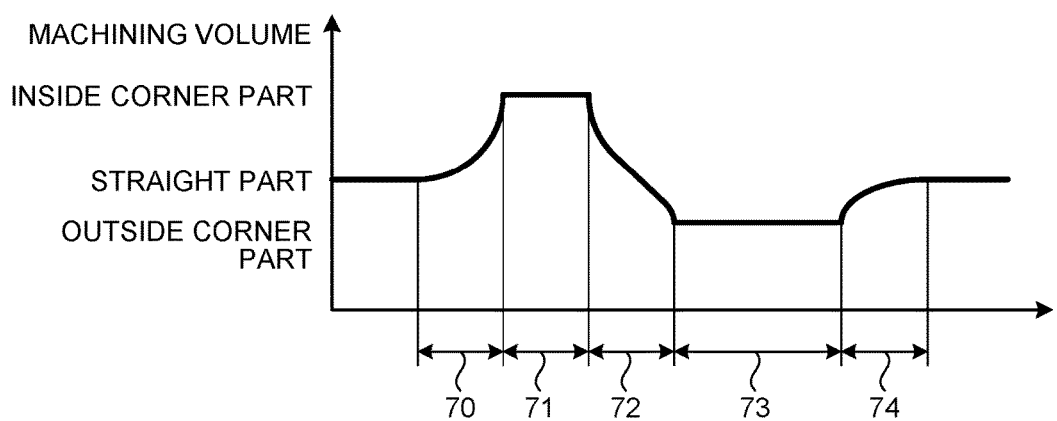
FIG. 7 is a diagram illustrating a machining volume when a circular-arc track of an inside corner is continuous to a circular-arc track of an outside corner in the present embodiment.

FIG. 7 illustrates the machining volume obtained every time the wire electrode 1 moves by a predetermined distance when the circular-arc track of the inside corner is continuous to the circular-arc track of the outside corner of the present embodiment. Sections 70 and 71 respectively indicate the pre-corner section and the middle corner section of the inside corner, a section 72 indicates the overlapping section of the post-corner section of the inside corner and the pre-corner section of the outside corner, and sections 73 and 74 respectively indicate the middle corner section and the post-corner section of the outside corner. The sections 70 and 71 indicate the machining volumes of the pre-corner section and the middle corner section of the inside corner of FIG. 6, and the sections 73 and 74 indicate the machining volumes of the middle corner section and the post-corner section of the outside corner of FIG. 6. In the section 72, a positive value is set when the volume is larger than the machining volume of the straight part and a negative value is set when the volume is smaller than the machining volume of the straight part. Here, a machining volume is obtained by adding the machining volume of the post-corner section of the inside corner and the machining volume of the pre-corner section of the outside corner.

Figure 8:
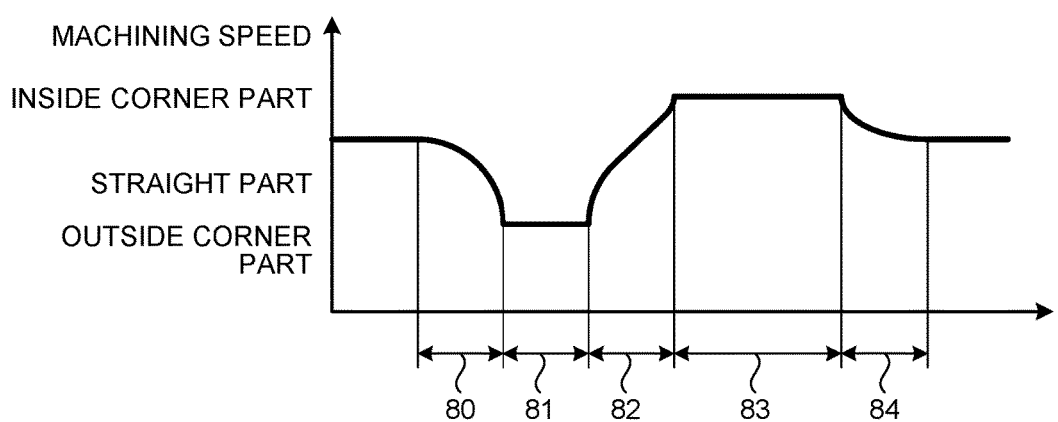
FIG. 8 is a diagram illustrating an ideal machining speed reference for obtaining the same shape and size of a corner part as that of a straight part when a circular-arc track of an inside corner is continuous to a circular-arc track of an outside corner in the present embodiment.

FIG. 8 illustrates an ideal machining speed reference for obtaining the same shape and size of the corner part as that of the straight part of the present embodiment when the circular-arc track of the inside corner is continuous to the circular-arc track of the outside corner. Sections 80 and 81 respectively indicate the pre-corner section and the middle corner section of the inside corner, a section 82 indicates the overlapping section of the post-corner section of the inside corner and the pre-corner section of the outside corner, and sections 83 and 84 respectively indicate the middle corner section and the post-corner section of the outside corner. Since the machining speed reference is in inverse proportion to the machining volume obtained every time the wire electrode 1 moves by a predetermined distance, the machining speed ratio of the corner part with respect to the straight part is opposite to the machining volume ratio illustrated in FIG. 7.

In each corner part of the continuous corners to be machined, the machining volume obtained every predetermined movement distance of the wire electrode 1 is calculated in advance, and the inverse ratio of the machining volumes of the straight part and the corner part is set to the corner speed coefficient of the middle corner section. Regarding the corner speed coefficients of the pre-corner and post-corner sections not overlapping in the continuous corners, the corner speed coefficients of the straight section and the middle corner section are interpolated by an appropriate function. In the section having the overlapping continuous corners, the speed coefficient of the start point is equal to the speed coefficient of the middle corner section of the pre-corner, the corner speed coefficient of the end point is equal to the speed coefficient of the middle corner section of the post-corner, and the corner speed coefficient therebetween is interpolated by a function as the opposite ratio to the machining volume ratio between the corresponding section and the straight section. Then, the corner speed reference is calculated by multiplying the corner speed coefficient for each corner section by the representative speed of the straight part, and hence satisfactory corner machining shape precision is realized.

Further, the corner speed coefficient is interpolated in the pre-corner and post-corner sections and the section having the overlapping continuous corners, but the corner speed reference may be interpolated. When the corner speed reference is interpolated, the corner speed reference of the middle corner section is calculated in advance by multiplying the corner speed coefficient by the representative speed of the straight part.

Regarding the interpolation of the corner speed coefficient and the corner speed reference in the section having the overlapping continuous corners, a precise inverse ratio does not necessarily need to be obtained in the machining volume ratio between the corresponding section and the straight section. This configuration will be described below with reference to FIG. 9.

Figure 9:
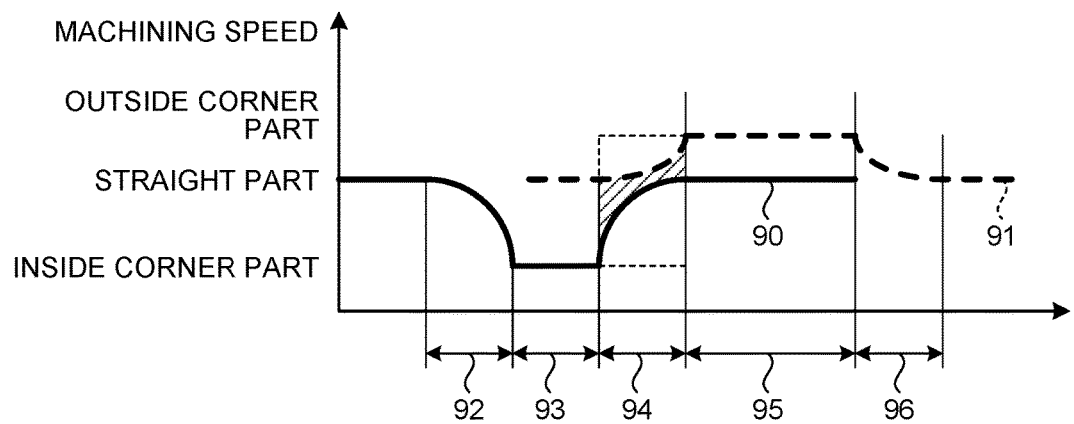
FIG. 9 is a diagram depicting an ideal machining speed reference for obtaining the same shape and size of a corner part as that of a straight part of a circular-arc track of a single inside corner and an ideal machining speed reference for obtaining the same shape and size of a corner part as that of a straight part of a circular-arc track of a single outside corner of the present embodiment so that a post-section of the inside corner overlaps a pre-section of the outside corner.

FIG. 9 is a diagram depicting an ideal machining speed reference for obtaining the same shape and size of the corner part as that of the straight part in the circular-arc track of the single inside corner and an ideal machining speed reference for obtaining the same shape and size of the corner part as that of the straight part in the circular-arc track of the single outside corner so that the post-section of the inside corner overlaps the pre-section of the outside corner.

In FIG. 9, a solid line 90 indicates the machining speed reference of the circular-arc track of the single inside corner, and a dashed line 91 indicates the machining speed reference of the circular-arc track of the single outside corner. Further, sections 92 and 93 respectively indicate the pre-corner section and the middle corner section of the inside corner, a section 94 indicates the post-corner section of the inside corner and the pre-corner section of the outside corner, and sections 95 and 96 respectively indicate the middle corner section and the post-corner section of the outside corner.

In the section 94 of the overlapping continuous corners, since the corner speed reference is interpolated within the range of the corner speed reference of both corners (the range indicated by a diagonal line of FIG. 9), the corner shape precision of the section having the overlapping continuous corners can be improved to a certain degree. That is, when the inside corner is continuous to the outside corner, the (machining) speed reference in the section of the overlapping corner may be a speed reference equal to or larger than the speed reference of the post-section of the single inside corner and equal to or smaller than the speed reference of the pre-section of the single outside corner. Further, when the outside corner is continuous to the inside corner, the speed reference of the overlapping corner section may be a speed reference equal to or smaller than the speed reference of the post-section of the single outside corner and equal to or larger than the speed reference of the pre-section of the single inside corner.

So far, a case has been described in which the circular-arc track of the inside corner is continuous to the circular-arc track of the outside corner. However, in the pattern of the other continuous corners, the continuous corner shape, the machining volume of the continuous corners, and the ideal machining speed reference for obtaining the same shape and size of the corner part as that of the straight part will be described below.

Figure 10:
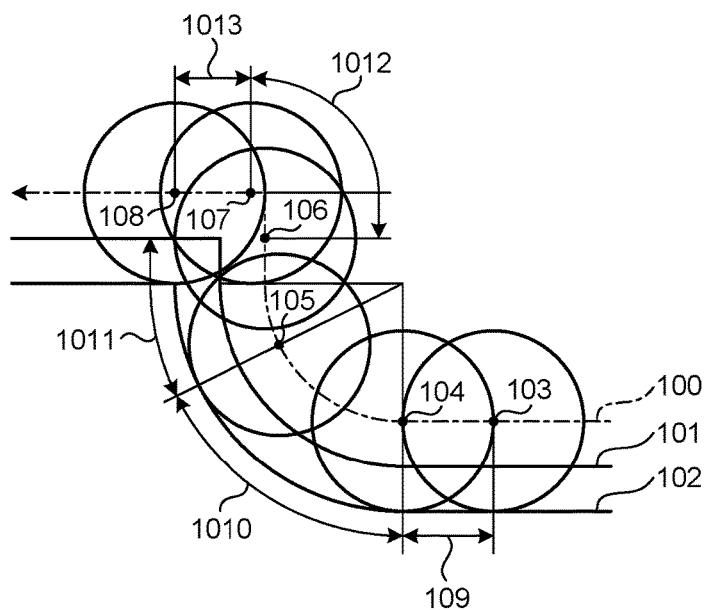
FIG. 10 is a diagram illustrating a state where a continuous shape from a circular-arc track of an inside corner to an edge track of an outside corner of the present embodiment is being machined.

FIG. 10 is a diagram illustrating a state where a continuous shape from the circular-arc track of the inside corner to the edge track of the outside corner of the present embodiment is being machined. A one-dotted chain line 100 indicates the relative movement track (offset track) of the center of the wire electrode 1 with respect to the workpiece 3 in the current machining process, and an arrow indicates the relative movement direction. A solid line 101 indicates the machining surface of the workpiece 3 obtained by the previous machining process, and a solid line 102 indicates the machining surface of the workpiece 3 obtained by the current machining process. Circles respectively centered at points 103, 104, 105, 106, 107, and 108 are electrical discharge circles.

The point 103 indicates the start point of the pre-corner section of the inside corner; the point 104 indicates the end point of the pre-corner section of the inside corner and the start point of the middle corner section of the inside corner; the point 105 indicates the end point of the middle corner section of the inside corner, the start point of the post-corner section of the inside corner, and the start point of the pre-corner section of the outside corner; the point 106 indicates the end point of the post-corner section of the inside corner, the end point of the pre-corner section of the outside corner, and the start point of the middle corner section of the outside corner; the point 107 indicates the end point of the middle corner section of the outside corner and the start point of the post-corner section of the outside corner; and the point 108 indicates the end point of the post-corner section of the outside corner. Further, a line 109 indicates the pre-corner section of the inside corner; a line 1010 indicates the middle corner section of the inside corner; a line 1011 indicates the post-corner section of the inside corner and the pre-corner section of the outside corner; a line 1012 indicates the middle corner section of the outside corner; and a line 1013 indicates the post-corner section of the outside corner.

Figure 11:
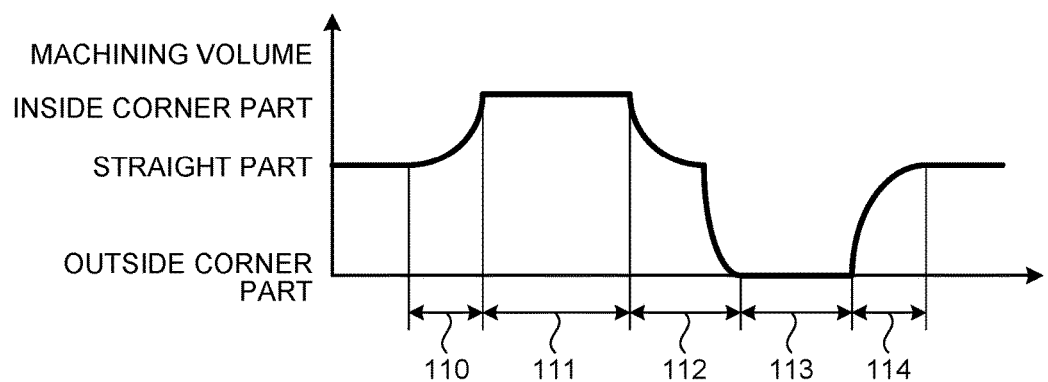
FIG. 11 is a diagram illustrating a machining volume when a circular-arc track of an inside corner is continuous to an edge track of an outside corner of the present embodiment.

FIG. 11 is a diagram illustrating the machining volume obtained every time the wire electrode 1 moves by a predetermined distance when the circular-arc track of the inside corner is continuous to the edge track of the outside corner of the present embodiment. Sections 110 and 111 respectively indicate the pre-corner section and the middle corner section of the inside corner, a section 112 indicates the section in which the post-corner section of the inside corner overlaps the pre-corner section of the outside corner, and sections 113 and 114 respectively indicate the middle corner section and the post-corner section of the outside corner. In the edge track of the outside corner, an idle running section in which a machining margin is zero is formed in the middle corner section. Further, a break point is formed with respect to a change in machining volume in the section 112, and hence the machining volume heads toward zero.

Figure 12:
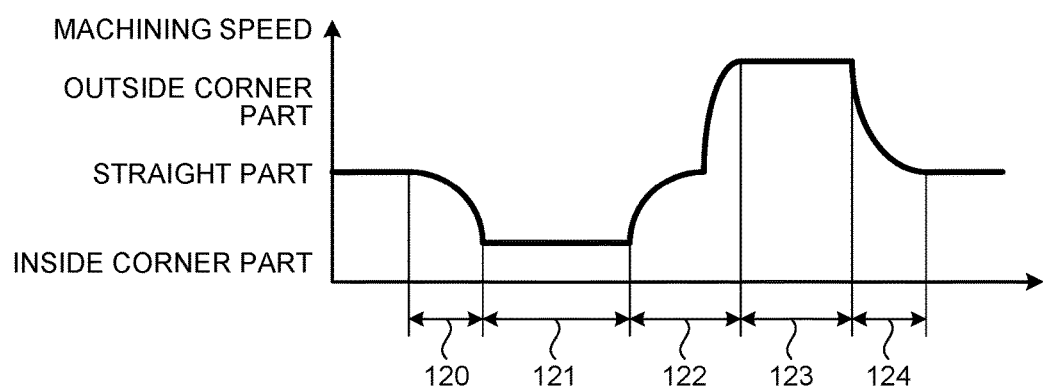
FIG. 12 is a diagram illustrating an ideal machining speed reference for obtaining the same shape and size of a corner part as that of a straight part of the present embodiment when a circular-arc track of an inside corner is continuous to an edge track of an outside corner.

FIG. 12 is a diagram illustrating an ideal machining speed reference for obtaining the same shape and size of the corner part as that of the straight part when the circular-arc track of the inside corner is continuous to the edge track of the outside corner in the present embodiment. Sections 120 and 121 respectively indicate the pre-corner section and the middle corner section of the inside corner, a section 122 indicates the overlapping section of the post-corner section of the inside corner and the pre-corner section of the outside corner, and sections 123 and 124 respectively indicate the middle corner section and the post-corner section of the outside corner. Since the machining speed reference is in inverse proportion to the machining volume obtained every predetermined movement distance, the machining speed ratio of the corner part with respect to the straight part is opposite to the machining volume ratio illustrated in FIG. 11. However, the speed reference becomes infinite as the machining volume is zero at the inverse ratio in the speed of the middle corner section of the outside corner, and hence an upper limit is set in the speed reference of the actual edge track of the outside corner.

Figure 13:
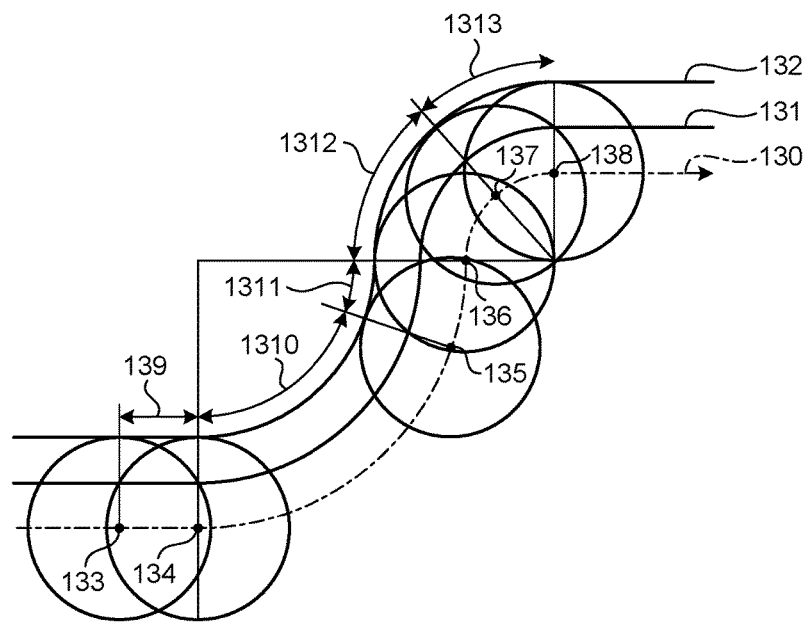
FIG. 13 is a diagram illustrating a state where a continuous shape from a circular-arc track of an outside corner to a circular-arc track of an inside corner of the present embodiment is being machined.

FIG. 13 is a diagram illustrating a state where a continuous shape from the circular-arc track of the outside corner to the circular-arc track of the inside corner of the present embodiment is being machined. A one-dotted chain line 130 indicates the relative movement track (offset track) of the center of the wire electrode 1 with respect to the workpiece 3 in the current machining process, and an arrow indicates the relative movement direction. A solid line 131 indicates the machining surface of the workpiece 3 obtained by the previous machining process, and a solid line 132 indicates the machining surface of the workpiece 3 obtained by the current machining process. Circles respectively centered at points 133, 134, 135, 136, 137, and 138 are electrical discharge circles.

The point 133 indicates the start point of the pre-corner section of the outside corner; the point 134 indicates the end point of the pre-corner section of the outside corner and the start point of the middle corner section of the outside corner; the point 135 indicates the end point of the middle corner section of the outside corner, the start point of the post-corner section of the outside corner, and the start point of the pre-corner section of the inside corner; the point 136 indicates the end point of the post-corner section of the outside corner, the end point of the pre-corner section of the inside corner, and the start point of the middle corner section of the inside corner; the point 137 indicates the end point of the middle corner section of the inside corner and the start point of the post-corner section of the inside corner; and the point 138 indicates the end point of the post-corner section of the inside corner.

Further, a line 139 indicates the pre-corner section of the outside corner; a line 1310 indicates the middle corner section of the outside corner; a line 1311 indicates the post-corner section of the outside corner and the pre-corner section of the inside corner; a line 1312 indicates the middle corner section of the inside corner; and a line 1313 indicates the post-corner section of the inside corner.

Figure 14:
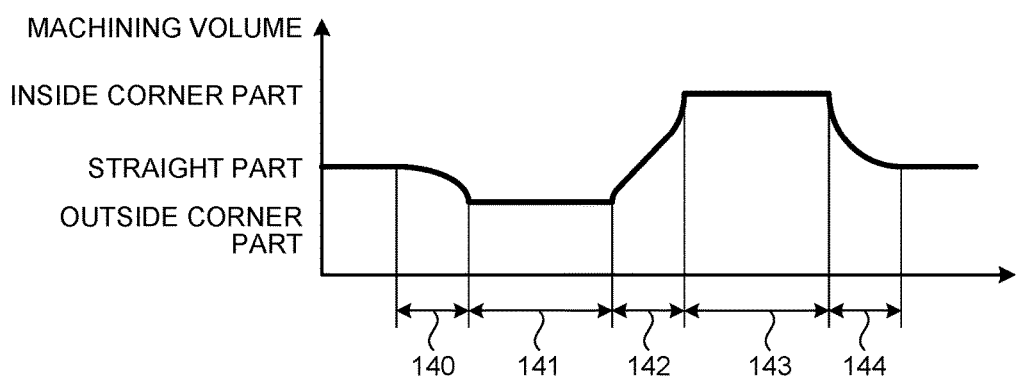
FIG. 14 is a diagram illustrating a machining volume when a circular-arc track of an outside corner is continuous to a circular-arc track of an inside corner of the present embodiment.

FIG. 14 is a diagram illustrating the machining volume obtained every time the wire electrode 1 moves by a predetermined distance when the circular-arc track of the outside corner is continuous to the circular-arc track of the inside corner in the present embodiment. Sections 140 and 141 respectively indicate the pre-corner section and the middle corner section of the outside corner, a section 142 indicates the overlapping section of the post-corner section of the outside corner and the pre-corner section of the inside corner, and sections 143 and 144 respectively indicate the middle corner section and the post-corner section of the inside corner.

Figure 15:
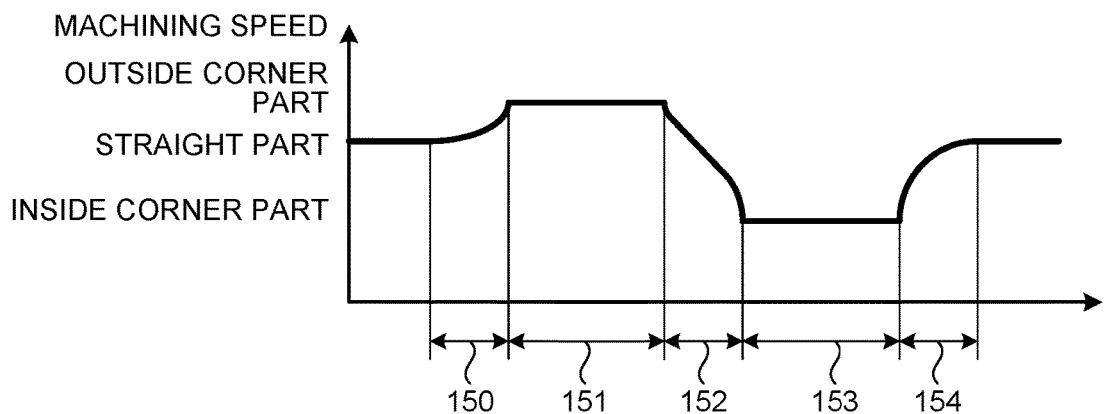
FIG. 15 is a diagram illustrating an ideal machining speed reference for obtaining the same shape and size of a corner part as that of a straight part of the present embodiment when a circular-arc track of an outside corner is continuous to a circular-arc track of an inside corner.

FIG. 15 is a diagram illustrating an ideal machining speed reference for obtaining the same shape and size of the corner part as that of the straight part when the circular-arc track of the outside corner is continuous to the circular-arc track of the inside corner in the present embodiment. Sections 150 and 151 respectively indicate the pre-corner section and the middle corner section of the outside corner, a section 152 indicates the overlapping section of the post-corner section of the outside corner and the pre-corner section of the inside corner, and sections 153 and 154 respectively indicate the middle corner section and the post-corner section of the inside corner. Since the machining speed reference is in inverse proportion to the machining volume obtained every predetermined movement distance, the machining speed ratio of the corner part with respect to the straight part is opposite to the machining volume ratio illustrated in FIG. 14.

Figure 16:
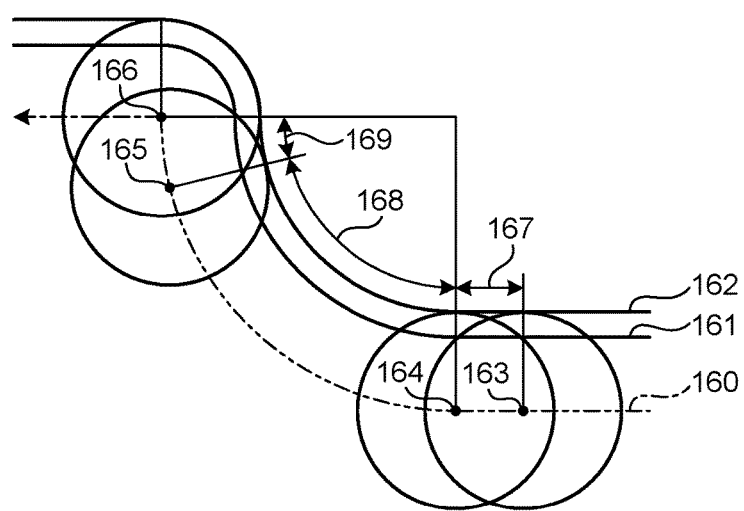
FIG. 16 is a diagram illustrating a state where a continuous shape from a circular-arc track of an outside corner to an edge track of an inside corner of the present embodiment is being machined.

FIG. 16 is a diagram illustrating a state where a continuous shape from the circular-arc track of the outside corner to the edge track of the inside corner in the present embodiment is being machined. A one-dotted chain line 160 indicates the relative movement track (offset track) of the center of the wire electrode 1 with respect to the workpiece 3 in the current machining process, and an arrow indicates the relative movement direction. A solid line 161 indicates the machining surface of the workpiece 3 obtained by the previous machining process, and a solid line 162 indicates the machining surface of the workpiece 3 obtained by the current machining process. Circles respectively centered at points 163, 164, 165, and 166 are electrical discharge circles.

The point 163 indicates the start point of the pre-corner section of the outside corner; the point 164 indicates the end point of the pre-corner section of the outside corner and the start point of the middle corner section of the outside corner; the point 165 indicates the end point of the middle corner section of the outside corner, the start point of the post-corner section of the outside corner, and the start point of the pre-corner section of the inside corner; and the point 166 indicates the end point of the post-corner section of the outside corner and the end point of the pre-corner section of the inside corner. Further, a line 167 indicates the pre-corner section of the outside corner; a line 168 indicates the middle corner section of the outside corner; and a line 169 indicates the post-corner section of the outside corner and the pre-corner section of the inside corner. Further, in the edge track of the inside corner, the end point of the pre-corner section indicates the vertex of the edge track, and a straight machining process is performed after passing the point 166. For this reason, the middle corner section only includes the vertex of the edge track, and hence the post-corner section does not exist.

Figure 17:
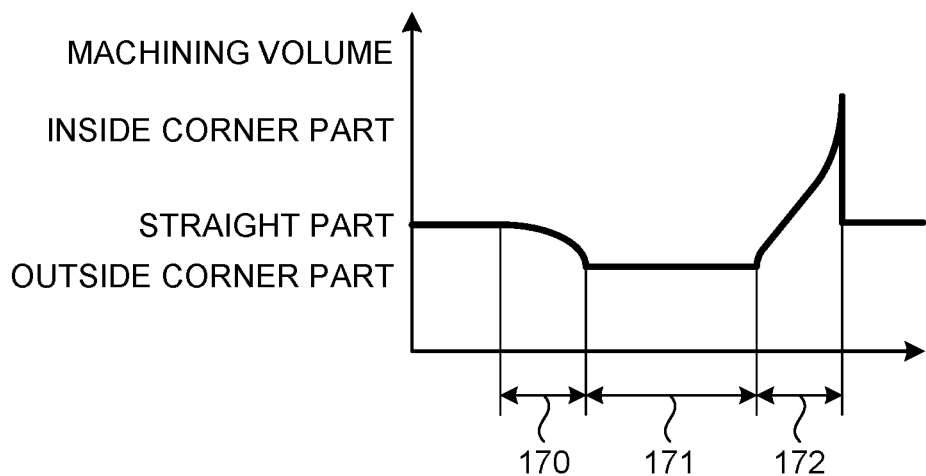
FIG. 17 is a diagram illustrating a machining volume when a circular-arc track of an outside corner is continuous to an edge track of an inside corner of the present embodiment.

FIG. 17 is a diagram illustrating the machining volume obtained every time the wire electrode 1 moves by a predetermined distance when the circular-arc track of the outside corner is continuous to the edge track of the inside corner in the present embodiment. Sections 170 and 171 respectively indicate the pre-corner section and the middle corner section of the outside corner, and a section 172 indicates the overlapping section of the post-corner section of the outside corner and the pre-corner section of the inside corner.

Figure 18:
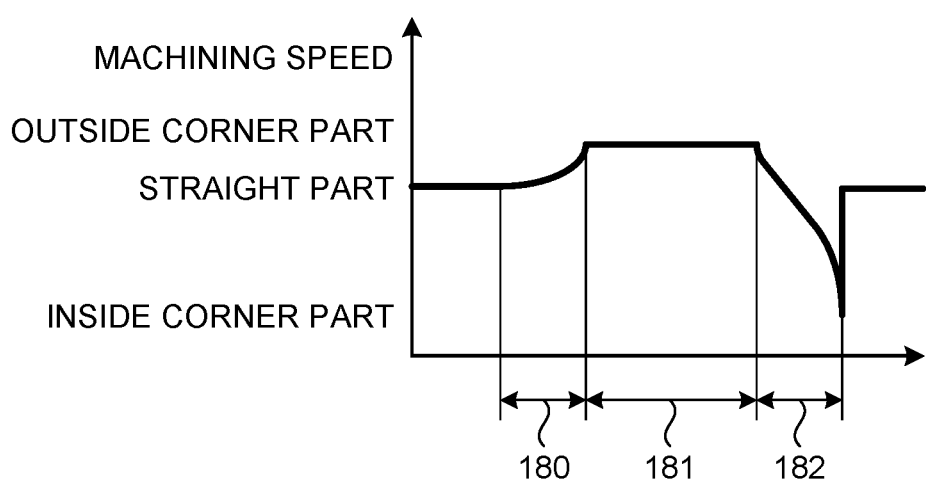
FIG. 18 is a diagram illustrating an ideal machining speed reference for obtaining the same shape and size of a corner part as that of a straight part of the present embodiment when a circular-arc track of an outside corner is continuous to an edge track of an inside corner.

FIG. 18 is a diagram illustrating an ideal machining speed reference for obtaining the same shape and size of the corner part as that of the straight part when the circular-arc track of the outside corner is continuous to the edge track of the inside corner in the present embodiment. Sections 180 and 181 respectively indicate the pre-corner section and the corner middle section of the outside corner, and a section 182 indicates the overlapping section of the post-corner section of the outside corner and the pre-corner section of the inside corner. Since the machining speed reference is in inverse proportion to the machining volume obtained every predetermined movement distance, the machining speed ratio of the corner part with respect to the straight part is opposite to the machining volume ratio illustrated in FIG. 17.

Figure 19:
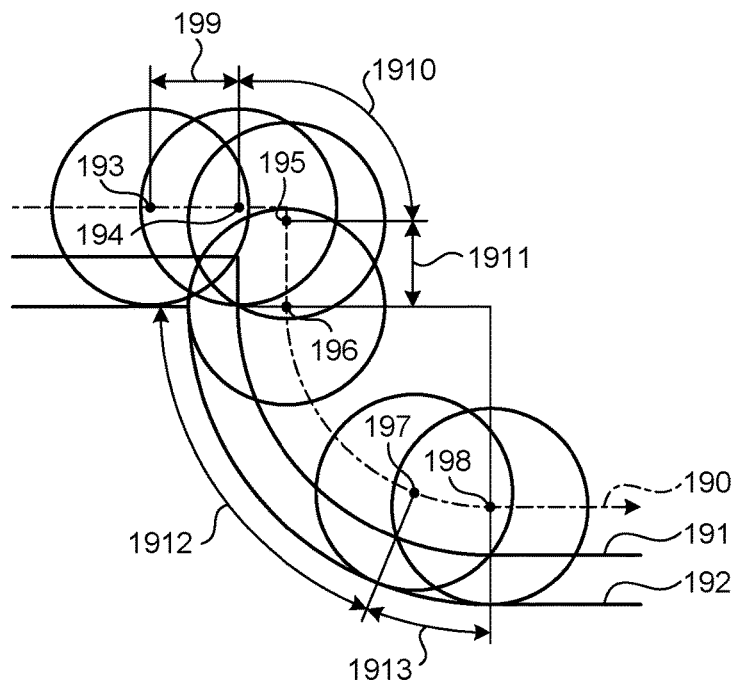
FIG. 19 is a diagram illustrating a state where a continuous shape from an edge track of an outside corner to a circular-arc track of an inside corner of the present embodiment is being machined.

FIG. 19 is a diagram illustrating a state where a continuous shape from the edge track of the outside corner to the circular-arc track of the inside corner in the present embodiment is being machined. A one-dotted chain line 190 indicates the relative movement track (offset track) of the center of the wire electrode 1 with respect to the workpiece 3 in the current machining process, and an arrow indicates the relative movement direction. A solid line 191 indicates the machining surface of the workpiece 3 obtained by the previous machining process, and a solid line 192 indicates the machining surface of the workpiece 3 obtained by the current machining process. Circles respectively centered at points 193, 194, 195, 196, 197, and 198 are electrical discharge circles.

The point 193 indicates the start point of the pre-corner section of the outside corner; the point 194 indicates the end point of the pre-corner section of the outside corner and the start point of the middle corner section of the outside corner; the point 195 indicates the end point of the middle corner section of the outside corner, the start point of the post-corner section of the outside corner, and the start point of the pre-corner section of the inside corner; the point 196 indicates the end point of the post-corner section of the outside corner, the end point of the pre-corner section of the inside corner, and the start point of the middle corner section of the inside corner; the point 197 indicates the end point of the middle corner section of the inside corner and the start point of the post-corner section of the inside corner; and the point 198 indicates the end point of the post-corner section of the inside corner.

Further, a line 199 indicates the pre-corner section of the outside corner, a line 1910 indicates the middle corner section of the outside corner, a line 1911 indicates the post-corner section of the outside corner and the pre-corner section of the inside corner, a line 1912 indicates the middle corner section of the inside corner, and a line 1913 indicates the post-corner section of the inside corner.

Figure 20:
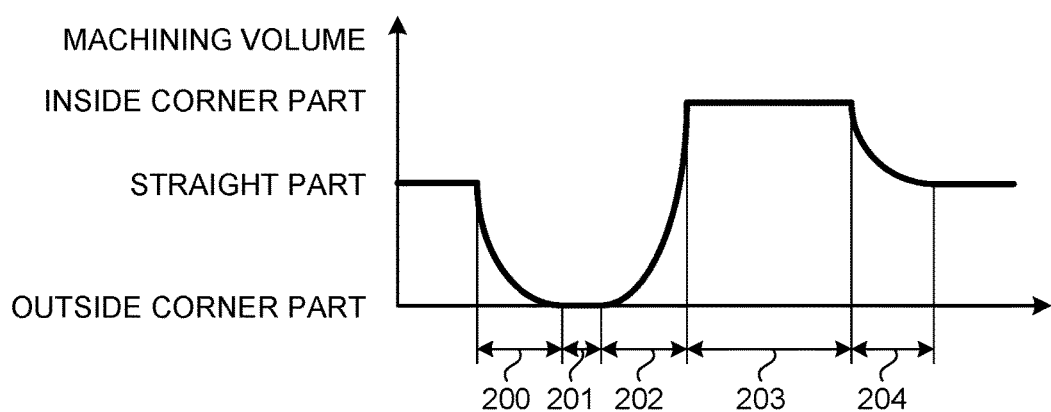
FIG. 20 is a diagram illustrating a machining volume when an edge track of an outside corner is continuous to a circular-arc track of an inside corner of the present embodiment.

FIG. 20 is a diagram illustrating the machining volume obtained every time the wire electrode 1 moves by a predetermined distance when the edge track of the outside corner is continuous to the circular-arc track of the inside corner in the present embodiment. Sections 200 and 201 respectively indicate the pre-corner section and the middle corner section of the outside corner; a section 202 indicates the overlapping section of the post-corner section of the outside corner and the pre-corner section of the inside corner; and sections 203 and 204 respectively indicate the middle corner section and the post-corner section of the inside corner. In the edge track of the outside corner, an idle running section in which a machining margin is zero is formed in the middle corner section 201.

Figure 21:
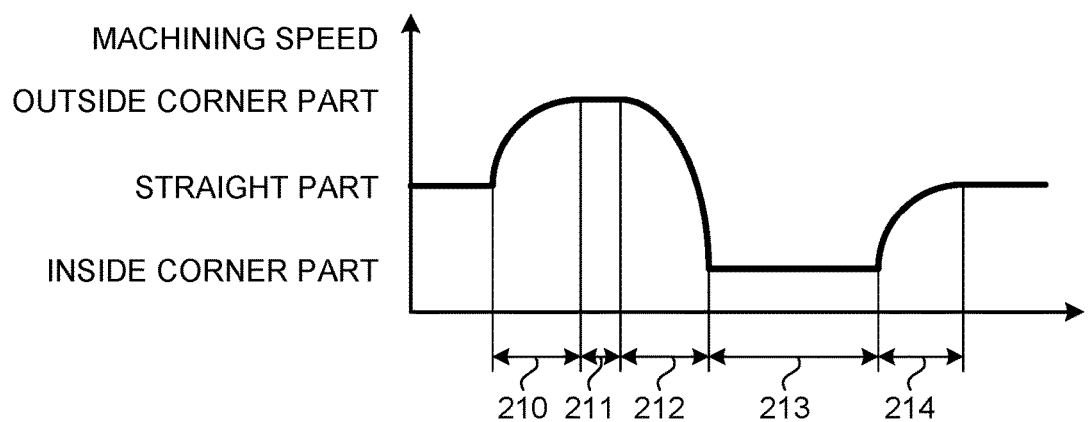
FIG. 21 is a diagram illustrating an ideal machining speed reference for obtaining the same shape and size of a corner part as that of a straight part of the present embodiment when a circular-arc track of an outside corner is continuous to a circular-arc track of an inside corner.

FIG. 21 is a diagram illustrating an ideal machining speed reference for obtaining the same shape and size of the corner part as that of the straight part when the circular-arc track of the outside corner is continuous to the circular-arc track of the inside corner in the present embodiment. Sections 210 and 211 respectively indicate the pre-corner section and the middle corner section of the outside corner, the section 212 indicates the overlapping section of the post-corner section of the outside corner and the pre-corner section of the inside corner, and sections 213 and 214 respectively indicate the middle corner section and the post-corner section of the inside corner. Since the machining speed reference is in inverse proportion to the machining volume obtained every predetermined movement distance, the machining speed ratio of the corner part with respect to the straight part is opposite to the machining volume ratio illustrated in FIG. 20. However, the speed reference becomes infinite as the machining volume is zero at the inverse ratio in the speed of the middle corner section of the outside corner, and hence an upper limit is set in the speed reference of the actual edge track of the outside corner.

Figure 22:
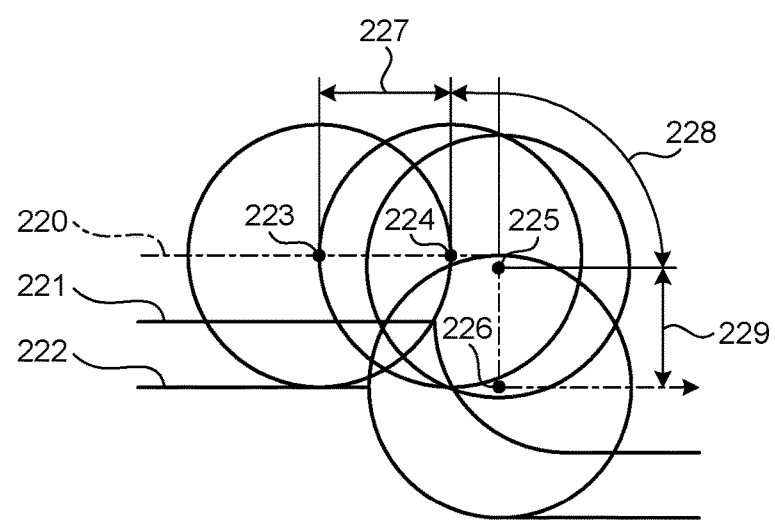
FIG. 22 is a diagram illustrating a state where a continuous shape from an edge track of an outside corner to an edge track of an inside corner of the present embodiment is being machined.

FIG. 22 is a diagram illustrating a state where a continuous shape from the edge track of the outside corner to the edge track of the inside corner in the present embodiment is being machined. A one-dotted chain line 220 indicates the relative movement track (offset track) of the center of the wire electrode 1 with respect to the workpiece 3 in the current machining process, and an arrow indicates the relative movement direction. A solid line 221 indicates the machining surface of the workpiece 3 obtained by the previous machining process, and a solid line 222 indicates the machining surface of the workpiece 3 obtained by the current machining process. Circles respectively centered at points 223, 224, 225, and 226 are electrical discharge circles.

The point 223 indicates the start point of the pre-corner section of the outside corner; the point 224 indicates the end point of the pre-corner section of the outside corner and the start point of the middle corner section of the outside corner; the point 225 indicates the end point of the middle corner section of the outside corner, the start point of the post-corner section of the outside corner, and the start point of the pre-corner section of the inside corner; and the point 226 indicates the end point of the post-corner section of the outside corner and the end point of the pre-corner section of the inside corner. Further, a line 227 indicates the pre-corner section of the outside corner; a line 228 indicates the middle corner section of the outside corner; and a line 229 indicates the post-corner section of the outside corner and the pre-corner section of the inside corner. Further, in the edge track of the inside corner, the end point of the pre-corner section is the vertex of the edge track, and a straight machining process is performed after passing the point 226. For this reason, the middle corner section only includes the vertex of the edge track, and hence the post-corner section does not exist.

Figure 23:
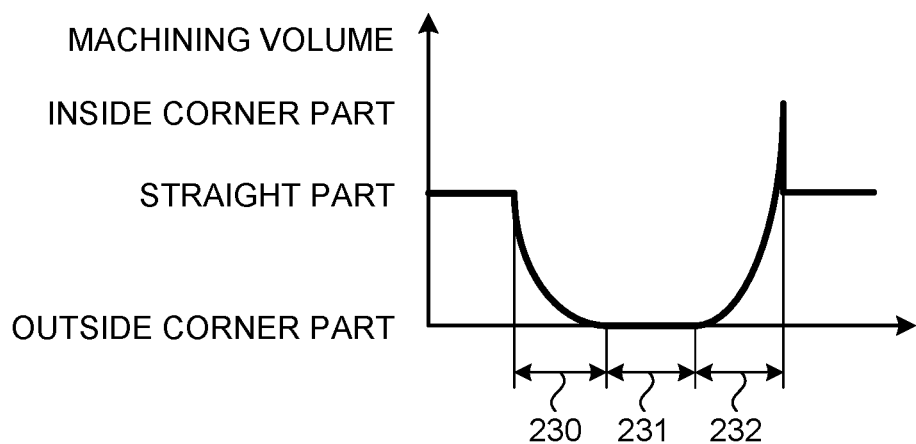
FIG. 23 is a diagram illustrating a machining volume when an edge track of an outside corner is continuous to an edge track of an inside corner of the present embodiment.

FIG. 23 is a diagram illustrating the machining volume obtained every time the wire electrode 1 moves by a predetermined distance when the edge track of the outside corner is continuous to the edge track of the inside corner in the present embodiment. Sections 230 and 231 respectively indicate the pre-corner section and the middle corner section of the outside corner, and a section 232 indicates the overlapping section of the post-corner section of the outside corner and the pre-corner section of the inside corner. In the edge track of the outside corner, an idle running section in which a machining margin is zero is formed in the middle corner section 231.

Figure 24:
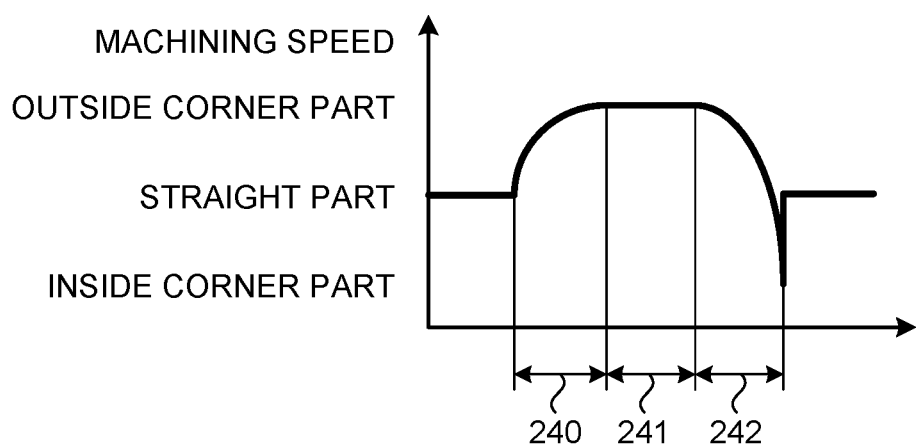
FIG. 24 is a diagram illustrating an ideal machining speed reference for obtaining the same shape and size of a corner part as that of a straight part of the present embodiment when a circular-arc track of an outside corner is continuous to an edge track of an inside corner.

FIG. 24 is a diagram illustrating an ideal machining speed reference for obtaining the same shape and size of the corner part as that of the straight part when the circular-arc track of the outside corner is continuous to the edge track of the inside corner in the present embodiment. Sections 240 and 241 respectively indicate the pre-corner section and the middle corner section of the outside corner, and a section 242 indicates the overlapping section of the post-corner section of the outside corner and the pre-corner section of the inside corner. Since the machining speed reference is in inverse proportion to the machining volume obtained every predetermined movement distance, the machining speed ratio of the corner part with respect to the straight part is opposite to the machining volume ratio illustrated in FIG. 23. However, the speed reference becomes infinite as the machining volume is zero at the inverse ratio in the speed of the middle corner section of the outside corner, and hence an upper limit is set in the speed reference of the actual edge track of the outside corner.

Other than the combination pattern in which the corner is continuous, there is a case in which the edge track of the inside corner is continuous to the circular-arc track of the outside corner and a case in which the edge track of the inside corner is continuous to the edge track of the outside corner. However, since the edge track of the inside corner does not include the post-corner section, the continuous corners do not have an overlapping section when the edge track of the inside corner appears earlier. Thus, these two patterns do not correspond to the continuous corners of the present embodiment, and the corner shape precision can be improved even by, for example, the technique of Patent Literature 1.

Figure 25:
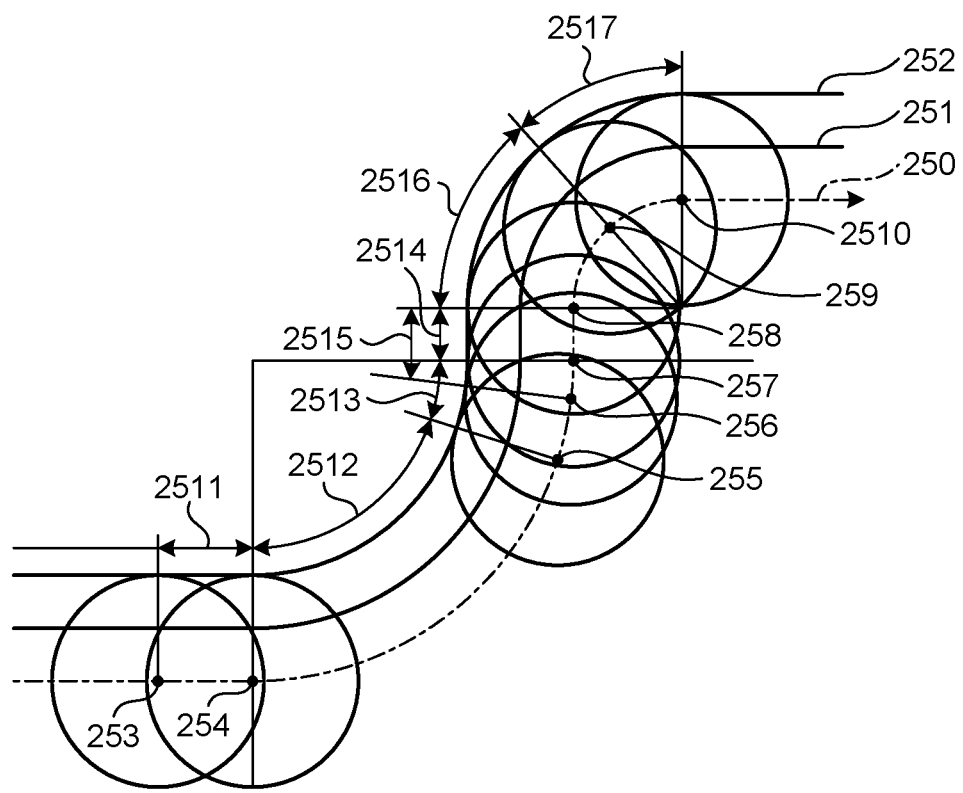
FIG. 25 is a diagram illustrating a state where a continuous shape from a circular-arc track of an outside corner to a straight track and a circular-arc track of an inside corner of the present embodiment is being machined.

Next, a method of determining continuous corners having an overlapping section will be described. FIG. 25 is a diagram illustrating a state where a continuous shape from the circular-arc track of the outside corner to the straight track and the circular-arc track of the inside corner in the present embodiment is being machined. A one-dotted chain line 250 indicates the relative movement track (offset track) of the center of the wire electrode 1 with respect to the workpiece 3 in the current machining process, and an arrow indicates the relative movement direction. A solid line 251 indicates the machining surface of the workpiece 3 obtained by the previous machining process, and a solid line 252 indicates the machining surface of the workpiece 3 obtained by the current machining process. Circles respectively centered at points 253, 254, 255, 256, 257, 258, 259, and 2510 are electrical discharge circles.

The point 253 indicates the start point of the pre-corner section of the outside corner; the point 254 indicates the end point of the pre-corner section of the outside corner and the start point of the middle corner section of the outside corner; the point 255 indicates the end point of the middle corner section of the outside corner and the start point of the post-corner section of the outside corner; the point 256 indicates the start point of the pre-corner section of the inside corner; the point 257 indicates the end point of the post-corner section of the outside corner; the point 258 indicates the end point of the pre-corner section of the inside corner and the start point of the middle corner section of the inside corner; the point 259 indicates the end point of the middle corner section of the inside corner and the start point of the post-corner section of the inside corner; and the point 2510 indicates the end point of the post-corner section of the inside corner. Further, a line 2511 indicates the pre-corner section of the outside corner, a line 2512 indicates the middle corner section of the outside corner, a line 2513 indicates the post-corner section of the outside corner, a line 2514 indicates the straight section between the outside corner and the inside corner, a line 2515 indicates the pre-corner section of the inside corner, a line 2516 indicates the middle corner section of the inside corner, and a line 2517 indicates the post-corner section of the inside corner.

In FIG. 25, when the length of the pre-corner section that appears later is longer than the length of the straight section between the continuous corners, the pre-corner section that appears later overlaps the post-corner section that appears earlier. In the present embodiment, a shape having an overlapping section in the continuous corners is called the continuous corners. Then, it is determined that the continuous corners have an overlapping section when the next equation (1) is satisfied.

$$\text{Length of pre-corner section that appears later} > \text{length of straight section between front and rear corners} \quad (1)$$

Next, the operation of the wire electrical discharge machining apparatus 500 according to the present embodiment will be described with reference to FIGS. 1 and 26. FIG. 26 is a flowchart illustrating a control operation when the corner is being machined by the wire electrical discharge machining apparatus 500 according to the present embodiment.

Before the machining process starts, a worker inputs a machining condition and a machining shape to the numerical control machine 6. Further, the numerical control machine 6 stores the pre-corner section length, the post-corner section length; and the corner diameter, the wire diameter, the electrical discharge gap, and the machining allowance margin which are necessary for the calculation of the corner speed coefficient in advance.

When the machining process starts in step S1 of FIG. 26, the wire electrode 1 is made to travel by a wire electrode traveling device (not illustrated), and the machining power source 4 applies a pulse voltage between the wire electrode 1 and the workpiece 3 via the power feeder 2 in accordance with the instruction of the oscillator 5, so that the machining process is performed. Further, the drive control device 9 drives the drive device 8 in accordance with the shaft feeding instruction output from the numerical control machine 6. The drive device 8 relatively moves the wire electrode 1 and the workpiece 3 in accordance with the movement of the workpiece table 7.

The numerical control machine 6 occasionally foresees, that is, determines whether the corner part exists at the front side of the center of the wire electrode 1 by a predetermined distance in the machining direction (step S2). Here, the predetermined distance is set to be sufficiently longer than the length of the pre-corner section supposed in general. When the corner part does not exist in the foreseeing section (step S2: No), the routine proceeds to step S3. Meanwhile, when the corner part exists in the foreseeing section (step S2: Yes), the routine proceeds to step S4.

In step S3, the machining speed of the straight part is controlled. That is, the numerical control machine 6 transmits the machining speed reference of the straight part to the drive control device 9. Further, when the straight part is being machined, the representative speed calculation device 14 temporarily stores the straight part machining speed reference transmitted from the numerical control machine 6, calculates the average value of the straight part machining speed (hereinafter, referred to as the representative speed of the straight part) every predetermined time, and stores the average value. Further, the average value of the machining speed is not limited to the representative speed of the straight part. For example, an intermediate value of a machining speed in a predetermined straight section may be used.

In step S4, the pre-corner section length calculation device 10 calculates the pre-corner section length, the post-corner section length calculation device 11 calculates the post-corner section length, and the corner speed coefficient calculation device 12 calculates the corner speed coefficient. Then, the routine proceeds to step S5. In step S4, the calculation is performed with reference to the corner diameter, the wire diameter, the electrical discharge gap, and the machining allowance margin stored in the numerical control machine 6. Further, an existing method disclosed in Patent Literature 1 can be used as the calculation equation for the pre-corner section length, the post-corner section length, and the corner speed coefficient.

In step S5, the continuous corner detection device 15 determines whether two or more corner parts exist inside a foreseeing section. When two or more corner parts exist inside the foreseeing section (step S5: Yes), the routine proceeds to step S6. Meanwhile, when only one corner part exists inside the foreseeing section (step S5: No), the routine proceeds to step S8.

In step S6, the continuous corner detection device 15 determines whether the pre-corner part is the edge track of the inside corner. When the pre-corner part is not the edge track of the inside corner (step S6: No), the routine proceeds to step S7. Meanwhile, when the pre-corner part is the edge track of the inside corner (step S6: Yes), the routine proceeds to step S8.

In step S7, the continuous corner detection device 15 calculates the straight line length between the continuous corners by referring to the machining shape information of the numerical control machine 6. Meanwhile, the pre-corner section length calculation device 10 calculates the pre-corner section length of the pre-corner section length of corner section that appears later and transmits the result to the continuous corner detection device 15. The continuous corner detection device 15 compares the straight line length between the continuous corners with the pre-section length of the corner section that appears later and determines whether the pre-corner section length of the corner section that appears later is longer than the straight line length between the continuous corners (step S7). When the pre-corner section length of the corner section that appears later is longer (step S7: Yes), it is determined the continuous corner part has an overlapping section. Then, the routine proceeds to step S9. When the straight line length between the continuous corners is longer (step S7: No), it is determined that the continuous corner part does not have an overlapping section. Subsequently, the routine proceeds to step S8.

In step S8, the machining speed of the single corner is controlled by using the pre-corner section length, the post-corner section length, and the corner speed coefficient calculated in step S4. The corner speed coefficient interpolation device 13 calculates the corner speed coefficients of the pre-corner and post-corner sections by the interpolation of the corner speed coefficient of the middle corner section through an appropriate function, and transmits the result to the speed reference calculation device 17. The speed reference calculation device 17 multiplies the corner speed coefficient transmitted from the corner speed coefficient interpolation device 13 by the representative speed of the straight part transmitted from the representative speed calculation device 14, and transmits the result as the corner speed reference to the drive control device 9.

In step S9, it is determined whether the center of the wire electrode 1 exists at a position where the corner sections of the continuous corner part overlap each other. When the center of the wire electrode 1 exists at a position where the corner sections overlap each other (step S9: Yes), the routine proceeds to step S10. Meanwhile, when the center of the wire electrode does not exist at a position where the corner sections overlap each other (step S9: No), the routine proceeds to step S11.

In step S10, the continuous corner part speed coefficient interpolation device 16 determines whether two continuous corner parts correspond to any one of the patterns of FIGS. 5, 10, 13, 16, 19, and 22, interpolates the corner speed coefficient of the pre-corner part and the corner speed coefficient of the post-corner part in response to the pattern of the continuous corner, and transmits the speed coefficient to the speed reference calculation device 17. Then, the routine proceeds to step S12.

In step S11, the corner speed coefficient interpolation device 13 calculates the corner speed coefficients of the pre-corner and post-corner sections by the interpolation of the corner speed coefficient of the middle corner section, and transmits the result to the speed reference calculation device 17. Then, the routine proceeds to step S12.

In step S12, when the center of the wire electrode 1 exists at a position where the corner sections of the continuous corner part overlap each other, the speed reference calculation device 17 multiplies the corner speed coefficient transmitted from the continuous corner part speed coefficient interpolation device 16 by the representative speed of the straight part transmitted from the representative speed calculation device 14, and transmits the result as the corner speed reference to the drive control device 9. When the center of the wire electrode 1 does not exist at a position where the corner sections of the continuous corner part overlap each other, the speed reference calculation device 17 multiplies the corner speed coefficient transmitted from the corner speed coefficient interpolation device 13 by the representative speed of the straight part transmitted from the representative speed calculation device 14 and transmits the result as the corner speed reference to the drive control device 9.

Subsequently, the routine proceeds to step S13. Then, when it is determined that the machining process ends (step S13: Yes), the routine ends. Meanwhile, when the machining process does not end (step S13: No), the routine returns to step S2.

Further, in the present embodiment, a method of interpolating the corner speed coefficients in the pre-corner and post-corner sections and the section of the overlapping continuous corner has been described, but a method of interpolating the corner speed references may be used. In the case of a method of interpolating the corner speed reference, the representative speed of the straight part is multiplied by the corner speed coefficient so as to calculate the corner speed reference in the middle corner section, and the corner speed reference is interpolated in the pre-corner and post-corner sections and the section of the overlapping continuous corner.

As described above, according to the configuration of the wire electrical discharge machining apparatus 500 of the present embodiment, even when the continuous corner having an overlapping corner section is being machined, the ideal machining speed reference for obtaining the same shape and size of the corner part as that of the straight part can be generated, and hence the corner shape precision of the continuous corner part can be improved.

That is, in the wire electrical discharge machining apparatus 500 according to the present embodiment, with respect to a plurality of continuous corners, the pre-corner section length of the corner that appears later and the straight line length between the front and rear corners in the continuous corners are calculated. Then, when the pre-corner section length of the corner that appears later is longer than the straight line length between the front and rear corners, it is determined the corner sections of the front and rear corners overlap each other in the continuous corners. When the continuous corner is detected, the pattern of the continuous corner is distinguished, and the speed coefficient is interpolated by connecting the speed coefficient of the corner part that appears earlier to the speed coefficient of the corner part that appears later in the section of the overlapping continuous corner, thereby calculating the machining speed reference of the corner part.

Accordingly, in the continuous corner shape in which the corner sections of the continuous corners overlap each other, it is possible to solve a problem in which an appropriate corner speed reference cannot be calculated and the corner shape precision is degraded in that the machining volume of the section having the overlapping continuous corners cannot be considered.

Further, the present invention is not limited to the above-described embodiment, in an execution phase, various modifications of the embodiment can be made within the range not departing from the spirit of the present invention. Further, the above-described present embodiment includes various embodiments of the present invention, and various inventions can be extracted by an appropriate combination of the disclosed components. For example, when the problems mentioned in the section of "Technical Problem" can be solved and the effect mentioned in the section of "Advantageous Effects of Invention" can be obtained even when some components are omitted from all components of the present embodiment, the present invention is extracted in which the components are omitted. Further, the components of different embodiments may be appropriately combined with one another.

INDUSTRIAL APPLICABILITY

As described above, the wire electrical discharge machining apparatus according to the present invention is useful to machine the corner shape of the workpiece by the wire electrical discharge machining process and is particularly useful for the wire electrical discharge machining apparatus designed to improve the shape precision of the continuous corner part.

REFERENCE SIGNS LIST 1 wire electrode, 2 power feeder, 3 workpiece, 4 machining power source, 5 oscillator, 6 numerical control (NC) unit, 7 workpiece table, 8 drive device, 9 drive control device, 10 pre-corner section length calculation device, 11 post-corner section length calculation device, 12 corner speed coefficient calculation device, 13 corner speed coefficient interpolation device, 14 representative speed calculation device, 15 continuous corner detection device, 16 continuous corner part speed coefficient interpolation device, 17 speed reference calculation device, 20, 50, 100, 130, 160, 190, 220, 250 one-dotted chain line, 21, 22, 51, 52, 60, 90, 101, 102, 131, 132, 161, 162, 191, 192, 221, 222, 251, 252 solid line, 61, 91 dashed line, 23, 24, 25, 26, 53, 54, 55, 56, 57, 58, 103, 104, 105, 106, 107, 108, 133, 134, 135, 136, 137, 138, 163, 164, 165, 166, 193, 194, 195, 196, 197, 198, 223, 224, 225, 226, 253, 254, 255, 256, 257, 258, 259, 2510 point, 27, 28, 29, 59, 510, 511, 512, 513, 109, 1010, 1011, 1012, 1013, 139, 1310, 1311, 1312, 1313, 167, 168, 169, 199, 1910, 1911, 1912, 1913, 227, 228, 229 line, 30, 31, 32, 40, 41, 42, 62, 63, 64, 65, 66, 70, 71, 72, 73, 74, 80, 81, 82, 83, 84, 110, 111, 112, 113, 114, 120, 121, 122, 123, 124, 140, 141, 142, 143, 144, 150, 151, 152, 153, 154, 170, 171, 172, 180, 181, 182, 200, 201, 202, 203, 204, 210, 211, 212, 213, 214, 230, 231, 232, 240, 241, 242 section, 500 wire electrical discharge machining apparatus

The invention claimed is:

1. A wire electrical discharge machining apparatus that applies a pulse voltage between a wire electrode and a workpiece while relatively moving the wire electrode and the workpiece by a drive device based on a numerical control (NC) program, the wire electrical discharge machining apparatus comprising:
a representative speed calculation device that calculates a representative speed of a straight part when the straight part is being machined;
a pre-corner section length calculation device that calculates a length of a pre-corner section in which a machining volume changes transitionally before an entrance of a corner part when the corner part is detected by the NC program;
a post-corner section length calculation device that calculates a length of a post-corner section in which a machining volume changes transitionally before an exit of the corner part;
a corner speed coefficient calculation device that calculates a machining speed ratio between a middle corner section and the straight part from a machining volume ratio between the straight part and the middle corner section in which the machining volume of the corner part becomes a constant value;
a corner speed coefficient interpolation device that interpolates a corner speed coefficient calculated by the corner speed coefficient calculation device in the pre-corner section and the post-corner section;
a speed reference calculation device that calculates a machining speed reference of the corner part based on the representative speed and the corner speed coefficient interpolated by the corner speed coefficient interpolation device;
a drive control device that controls the drive device based on the machining speed reference calculated by the speed reference calculation device; and
a continuous corner detection device that determines that continuous corner sections overlap each other when a length of the straight part connecting two corner parts is shorter than the length of the pre-corner section calculated by the pre-corner section length calculation device.

2. The wire electrical discharge machining apparatus according to claim 1,
wherein when the continuous corner detection device detects overlapping of the continuous corner sections, the corner speed coefficient is set to a value obtained by interpolating the corner speed coefficient of a corner part that appears earlier and the corner speed coefficient of a corner part that appears later in a section having the overlapping continuous corners.

3. The wire electrical discharge machining apparatus according to claim 1,
wherein when the continuous corner detection device detects overlapping of the continuous corner sections, the machining speed reference is set to a value obtained by interpolating the machining speed reference of a corner part that appears earlier and the machining speed reference of a corner part that appears later in a section having the overlapping continuous corners.

4. A wire electrical discharge machining apparatus that applies a pulse voltage between a wire electrode and a workpiece while relatively moving the wire electrode and the workpiece by a drive device based on a numerical control (NC) program, the wire electrical discharge machining apparatus comprising:

a representative speed calculation device that calculates a representative speed of a straight part when the straight part is being machined;

a pre-corner section length calculation device that calculates a length of a pre-corner section in which a machining volume changes transitionally before an entrance of a corner part when the corner part is detected by the NC program;

a post-corner section length calculation device that calculates a length of a post-corner section in which a machining volume changes transitionally before an exit of the corner part;

a corner speed coefficient calculation device that calculates a machining speed ratio between a middle corner section and the straight part from a machining volume ratio between the straight part and the middle corner section in which the machining volume of the corner part becomes a constant value;

a corner speed coefficient interpolation device that interpolates a corner speed coefficient calculated by the corner speed coefficient calculation device in the pre-corner section and the post-corner section;

a speed reference calculation device that calculates a machining speed reference of the corner part based on the representative speed and the corner speed coefficient interpolated by the corner speed coefficient interpolation device; and a drive control device that controls the drive device based on the machining speed reference calculated by the speed reference calculation device, wherein when an inside corner is continuous to an outside corner, the speed reference calculation device sets the machining speed reference in a section having overlapping continuous corners to be equal to or larger than a machining speed reference of a post-section of a single inside corner and equal to or smaller than a machining speed reference of a pre-section of a single outside corner.

5. A wire electrical discharge machining apparatus that applies a pulse voltage between a wire electrode and a workpiece while relatively moving the wire electrode and the workpiece by a drive device based on a numerical control (NC) program, the wire electrical discharge machining apparatus comprising:

a representative speed calculation device that calculates a representative speed of a straight part when the straight part is being machined;

a pre-corner section length calculation device that calculates a length of a pre-corner section in which a machining volume changes transitionally before an entrance of a corner part when the corner part is detected by the NC program;

a post-corner section length calculation device that calculates a length of a post-corner section in which a machining volume changes transitionally before an exit of the corner part;

a corner speed coefficient calculation device that calculates a machining speed ratio between a middle corner section and the straight part from a machining volume ratio between the straight part and the middle corner section in which the machining volume of the corner part becomes a constant value;

a corner speed coefficient interpolation device that interpolates a corner speed coefficient calculated by the corner speed coefficient calculation device in the pre-corner section and the post-corner section;

a speed reference calculation device that calculates a machining speed reference of the corner part based on the representative speed and the corner speed coefficient interpolated by the corner speed coefficient interpolation device; and a drive control device that controls the drive device based on the machining speed reference calculated by the speed reference calculation device, wherein when an outside corner is continuous to an inside corner, the speed reference calculation device sets the machining speed reference in a section having overlapping continuous corners to be equal to or smaller than a machining speed reference of a post-section of a single outside corner and equal to or larger than a machining speed reference of a pre-section of a single inside corner.

\* \* \* \* \*